Jan. 5, 1965 R. B. APPLEGATE 3,163,921
ARMATURE WINDING METHOD
Filed Aug. 28, 1961 3 Sheets-Sheet 1

INVENTOR.
ROBERT B. APPLEGATE
BY
Oberlin, Maky & Donnelly
ATTORNEYS

*INVENTOR.*
ROBERT B. APPLEGATE
BY
Oberlin, Maky & Donnelly
ATTORNEYS

Jan. 5, 1965   R. B. APPLEGATE   3,163,921
ARMATURE WINDING METHOD

Filed Aug. 28, 1961   3 Sheets-Sheet 3

*INVENTOR.*
ROBERT B. APPLEGATE
BY
Oberlin, Maky & Donnelly
ATTORNEYS

United States Patent Office 3,163,921
Patented Jan. 5, 1965

3,163,921
ARMATURE WINDING METHOD
Robert B. Applegate, North Olmsted, Ohio, assignor to Cleveland Electrical Equipment Co., Inc., Cleveland, Ohio, a corporation of Ohio
Filed Aug. 28, 1961, Ser. No. 134,499
7 Claims. (Cl. 29—155.5)

The present invention relates generally as indicated to an armature winding machine and to a method of winding armatures for dynamoelectric machines. More particularly, the present invention relates to improvements in armature winding methods.

In armature winding machines and methods disclosed in the prior art the armature to be wound is alternately reciprocated and rotated with respect to a winding throat to simultaneously wind armature coils in longitudinal wire-receiving slots formed in the armature body and across the opposite ends of said body. Such movements of the armature body are effected as by means of a chuck shaft in which the armature shaft is gripped for alternate reciprocation and rotation with respect to a winding throat formed by radially inwardly extending wire-feed fingers through which the wires are fed into the wire-receiving slots and across the ends of the armature body. An advantage of such winding of armatures is that the coils are uniform and tight with end loops symmetrically interwoven and interlaced thereby to resist tendency of the windings to "breathe" or expand under the influence of centrifugal force, such windings being referred to as "basket weave" windings.

Another advantage is that the coils are all of substantially equal length and thus of substantially equal resistance for improved performance characteristics of the motor or generator in which the armature is used.

Yet another advantage is that such "basket weave" winding is performed rapidly and automatically without hand work and without damage to the insulating coating of the wire.

Yet another advantage is that the coils are tight and compact with correspondingly reduced $I^2 R$ copper loss, while the interlaced and interwoven "basket weave" end loops afford ventilation for dissipation of heat generated in the armature in its use in a motor, generator and the like.

In the aforesaid patented armature winding machines and methods for producing armatures with basket weave windings there are involved several secondary operations following the winding operation such as mounting the commutator on the armature shaft, stripping the insulation from the ends of the coils, and the placing, staking, and soldering of the stripped wires to the commutator bars.

It is a principal object of this invention to provide an armature winding machine and method whereby, when the wound armature is discharged from the machine, the ends of the coils have already been placed in slots in the commutator bars. Thus, all that remains to be done is to lock the commutator on the armature shaft and to solder the coil ends to the commutator bars.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 1:
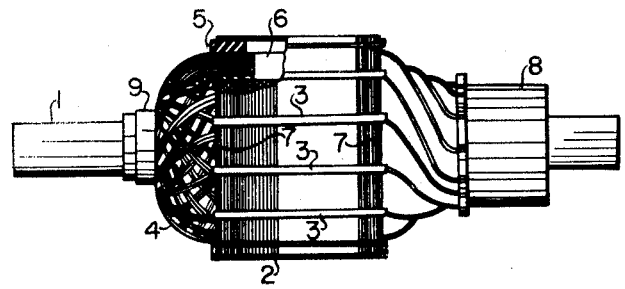
FIG. 1 is a side elevation view, partly in cross-section, showing a typical armature such as is employed in an automobile generator.

Referring now in further detail to the drawings, and first to FIG. 1, the armature therein comprises a shaft 1, with a laminated body 2 tightly fitted on said shaft, said body being formed with slots 3 axially therethrough into which the wire coils 4 are adapted to be wound. As shown, the wires are held in place in the slots by suitable means such as the wedges 5 or the like, and if desired, each slot 3 may be lined with a generally U-shaped insulating member 6. The laminations 7 at opposite ends of the laminated body 2 are preferably formed of insulating material so as to decrease the possibility of scraping of insulation from the wires and the consequent short-circuiting and/or grounding to the core 2 or shaft 1 of the coils 4. Adjacent one end of the laminated body 2 is a commutator 8 comprising a plurality of bars or segments, to adjacent ones of which the ends of each coil are connected. The armature shaft 1 may also have mounted thereon adjacent the ends of said laminated body 2 insulating sleeves 9.

For a more complete understanding of the armature winding machine as a whole, reference may be had to the above-listed patents; but in any event, the same basically comprises a power plant (mechanical, electrical, hydraulic, or pneumatic) operative to alternately axially reciprocate the main chuck shaft 20 and to rotate the same about its longitudinal axis. In the present case the chuck shaft 20 is equipped with a stepped collet 21 in which the armature shaft 1 and the commutator 8 is adapted to be inserted and gripped. The collet 21 may be actuated in known manner as by means of the draw rod 23.

The chuck shaft 20 has mounted thereon a slotted wire-gripping and cutting mechanism 24, the details of which are disclosed in the Pat. No. 2,718,359. Essentially, such wire-gripping and cutting mechanism comprises adjacent rings formed with axial slots around the periphery thereof in number and in angular position corresponding to the slots in the armature to be wound. The slotted rings are preferably arranged so that in one relative rotary position thereof, the wires are gripped thereby, and in another relative rotary position, the wires therein are cut to release the wound armature while the adjacent portions of the wires are gripped preparatory to insertion of the next armature together with the commutator 8 into the collet 21.

Figure 3:
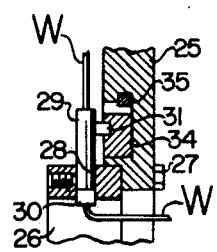
FIG. 3 is a cross-section view taken substantially along the line 3—3, FIG. 2.
Figure 2:
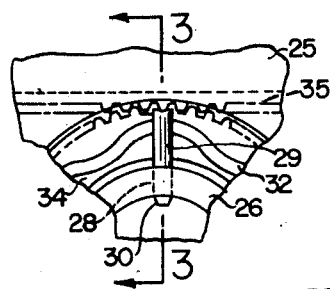
FIG. 2 is a fragmentary front elevation view of a winding head provided with radially reciprocable wire-feed fingers.

The machine has a fixed plate 25 (see FIGS. 2 and 3) to which the ring 26 is secured by suitable bolts 27, said ring 26 being formed with a series of radial holes 28 therethrough corresponding in number and in position to the slots 3 of the armature to be wound.

Fitted into said holes 28 are radially extending wire-feed fingers 29 with central openings longitudinally therethrough through which the wires W are adapted to be fed and with beveled inner ends 30 to pass through the slots 3 of the armature during the winding operation.

Herein the wire-feed fingers 29 are mounted for radial inward and radial outward movement. To effect such radial movement, each wire feed finger 29 is provided with a laterally extending pin 31 extending into a cam groove 32 of a ring 34 which is adapted to be oscillated in the machine head 25 as by means of a reciprocating gear rack 35 or equivalent means. The radial movements of the wire-feed fingers 29 will be later described in detail.

In the present case the armature shaft 1 is initially of greater length than required and the commutator 8 is preferably a wring-fit or light press-fit on one end of the armature shaft 1, the commutator 8 being positioned farther away from the slotted body 2 for the winding operation than in the completed armature. Moreover, the commutator 8 will be provided with a flange portion 36 of larger diameter than in the completed armature, such flange 36 being formed with wire-receiving slots 37 having narrow bottom portions to snugly receive the wires W therein and flared outer portions to facilitate insertion of the wires W radially thereinto.

Figure 4:
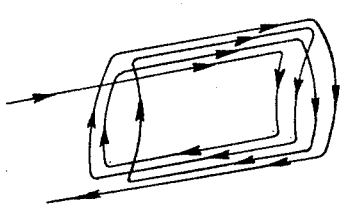
FIG. 4 is a perspective view of a preferred form of coil which is adapted to be wound on the machine herein.
Figure 6:
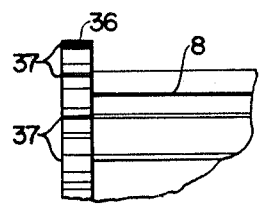
FIG. 6 is a fragmentary side elevation view of the commutator which is used in the performance of the present method.
Figure 7:
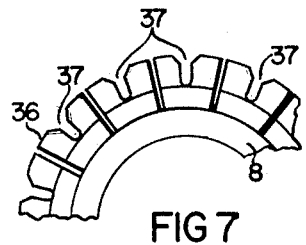
FIG. 7 is a fragmentary end elevation view showing the slots in the commutator in which the starting and finishing ends of the wires are placed during the winding operation.
Figure 5:
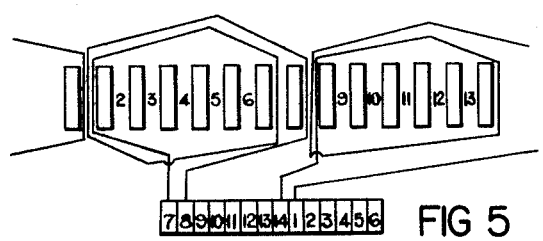
FIG. 5 is a developed view of an armature showing a pair of coils and their connections to the commutator.

As an illustrative example, the armature body 2 herein has fourteen slots and the commutator 8 has a like number of commutator bars or segments, this being shown in FIG. 5 which is a developed view of two of the fourteen coils showing the connections of the coils to successive commutator bars. Thus, the coils (herein shown as being of the distributive type) are simultaneously wound in the slots numbered 1-7-8, 2-8-9, 3-9-10, 4-10-11, 5-11-12, 6-12-13, 7-13-14, 8-14-1, 9-1-2, 10-2-3, 11-3-4, 12-4-5, 13-5-6, and 14-6-7. For the first coil 1-7-8, the wire from commutator bar 7 passes through slot 1 and the last turn from slot 8 is connected to the adjacent commutator bar 8 and, of course, the second coil 2-8-9 starts from commutator bar 8 and passes through slot 2 and the last turn from slot 9 is connected to commutator bar 9. The remaining coils are similarly connected to adjacent commutator bars. A typical four turn coil is shown in FIG. 4, the four conductors on one side being disposed in one slot and the four conductors on the opposite side being disposed in two adjacent slots with two conductors in each.

Figure 8:
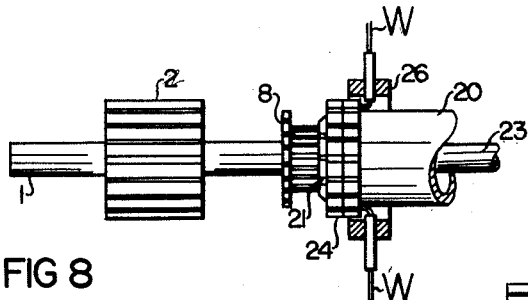
FIGS. 8 to 16 illustrate diagrammatically the successive steps in the winding of the armature illustrated in FIG. 1.
Figure 9:
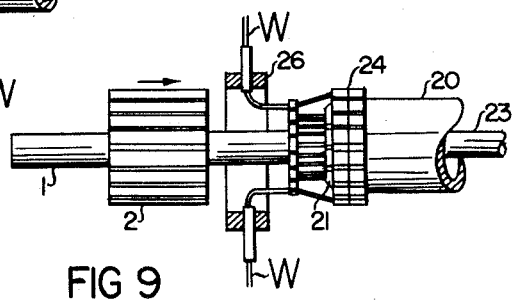
Figure 10:
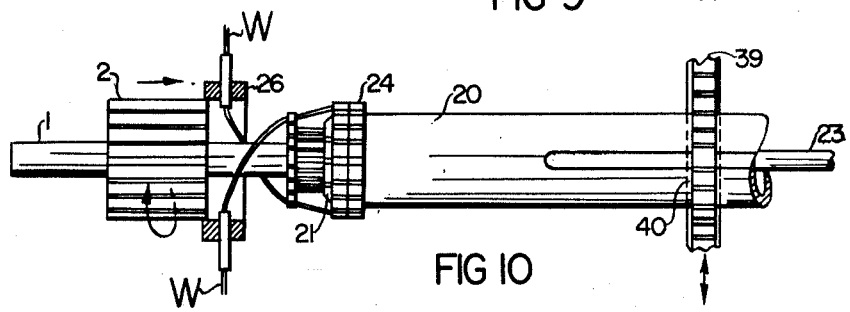
Figure 11:
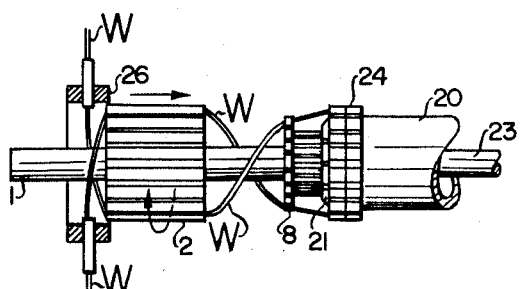
Figure 12:
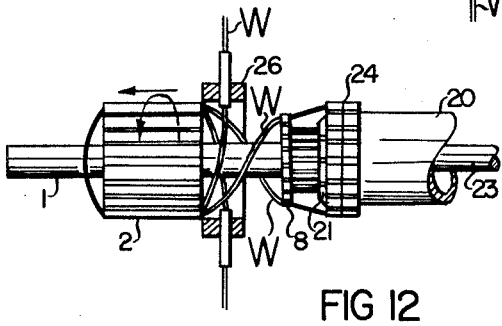
Figure 13:
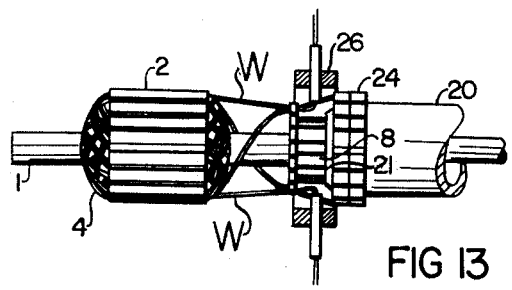
Figure 14:
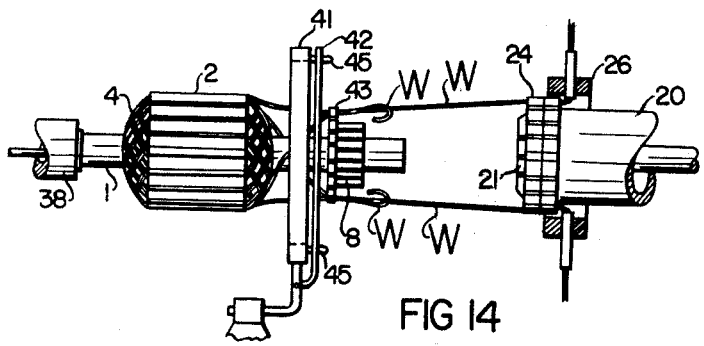
Figure 15:
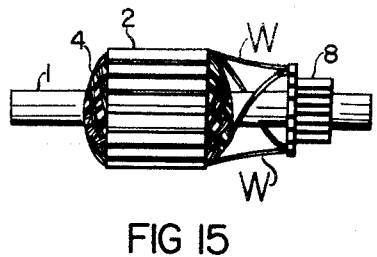
Figure 16:
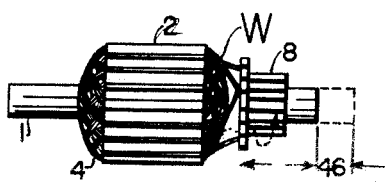

Starting with an armature body or core 2 fixed on the armature shaft 1 which is of greater length than in the finished armature and with a commutator 8 mounted on the shaft 1 a greater distance than in the finished armature but with its slots 37 aligned with the slots 3 of the core 2, the following steps may be followed when using the machine herein and when practicing the present method:

(1) Insert the armature shaft 1 and commutator 8 into the collet 21 as in FIG. 8, using, for example, the loading ram 38 (FIG. 14);

(2) With the collet 21 closed to grip the shaft 1 and commutator 8, retract the main chuck shaft 20 to position the wire-gripping and cutting head 24 and the commutator 8 to one side of the winding head 26 and the armature body 2 on the other side as illustrated in FIG. 9, the wire feed fingers 29 being disposed closely adjacent to the flanged end of the commutator 8 and being shifted radially inward to press the wires W radially inward to the bottoms of the slots 37 in the commutator;

(3) Shift the main chuck shaft 20 axially and rotate it as shown in FIG. 10 as by means of the gear rack 39 which meshes with a gear 40 in which the main chuck shaft 20 is axially slidably keyed, this operation being effective to lace the wires W as shown;

(4) Successively move the main chuck shaft 20 axially and rotate it as in FIG. 11 to draw the armature body 2 through the winding head 26 to thus cause the feed fingers 29 to run through the slots in the armature body 2 to lay the wires W into the armature slots and to interlace and interweave the wires W at the adjacent end of the body 2;

(5) Successively move the main chuck shaft 20 axially and rotate it as in FIG. 12, the feed fingers 29 having again moved through the slots of the armature core 2 but this time through slots substantially diametrically opposed to those traversed in step 4 and the wires W having again been interlaced at the commutator end of the body 2;

(6) Repeat the preceding steps 4 and 5 except rollover twice in succession in the opposite direction and then repeat as often as required, alternately changing the direction of roll-over as indicated;

(7) After the armature body 2 has been wound with the required number of turns, the last roll-over of step 5 is omitted, and instead, the main chuck shaft 20 is shifted to the FIG. 13 position with the wire feed fingers 29 moved radially inwardly to press the finishing ends of the coils into the commutator slots 37, the binding device 41 (see FIG. 14) having been swung to a position coaxial with the armature body 2;

(8) Move the main chuck shaft 20 to the position of FIG. 14 with the wire-cutting and gripping unit 24 open for placement of the finishing ends of the wires W thereinto and at the same time pull the armature through the binding device 41 as by use of the loading ram 38 to withdraw the now released and hooked beginning ends of the wires W from the wire-gripping and cutting unit 24;

(9) Close the wire-cutting and gripping unit 24 to cut the outer finishing wires W, and after such wires W are cut and gripped, actuate the stripper ring 42 of the binding device 41 to shove a rubber band, spring ring, or the like 43 off the pins 45 to hold the circular array of wires W around the commutator 8 and in the slots 37 of the latter, or in lieu of a binding device 41 a tape wrapper may be used to wrap cloth, plastic or like tape around the wires W or a radial staking or roll displacer device may be employed for displacing the metal of the commutator slots 37 so as to lock the wires W in place;

(10) The wires W are prepared for fluxing and soldering in the commutator slots 37 as by first heating the commutator flange 36 to a relatively high temperature, such as 1000° F. which, in the case of most of the commonly used insulating resins, causes decomposition of the insulation whereby conventional fluxing and soldering operations may be performed. However, in lieu of that, suitable wire stripping means such as wire brushes, scrapers, abraders, solvents, or the like (not shown) may be provided to remove the insulation from the wires W when they are jammed in the slots 37 in FIGS. 9 and 13;

(11) The wires W thus soldered in place in the commutator slots 37 are then clipped at the flange 36 and the flange can be turned or otherwise machined, to its final diameter as shown in FIGS. 1, 15, and 16;

(12) The commutator 8 is then twisted and axially advanced toward the armature body to its final position as shown in FIGS. 1 and 16 and is locked in that position as by setting of a high shear strength liquid plastic applied at the shaft 1-commutator 8 joint; and

(13) The excess length 46 of the armature shaft 1 is cut off whereupon the armature thus completed may be subjected to other conventional secondary operations, such as dipping or impregnation operations, finishing of the commutator, and insertion of wedges 5. In some instances, as when a pulley or coupling is mounted on the commutator end of shaft 1, it is not necessary to cut off that end of shaft 1.

It is to be understood that the present invention is applicable to the manufacture of armatures having herein disclosed and having a different pattern of distribution of the wires in the armature slots.

Other modes of applying the principle of the invention may be employed, change being made as regards the details described, provided the features stated in any of the following claims, or the equivalent of such, be employed.

I therefore particularly point out and distinctly claim as my invention:

1. The method of making an armature having a slotted body and commutator mounted in axially spaced relation on a shaft which comprises placing the beginning ends of wires in the slots of said commutator; winding coils in the slots of said body and across the ends thereof; and aligning the finishing ends of the wires with the slots of said commutator adjacent the slots in which said wires were originally placed; directly thereafter placing the finishing ends of the wires in such slots of said commutator.

2. The method of claim 1 wherein said commutator is turned and axially advanced toward said body.

3. The method of claim 1 wherein said commutator is turned and axially advanced toward said body; and wherein said commutator is locked on said shaft in the aforesaid turned and axially advanced position.

4. The method of claim 1 wherein the beginning and finishing ends of the wires are soldered in place in the slots of said commutator; and wherein said commutator is turned and axially advanced toward said body.

5. The method of claim 1 wherein the wires in the slots of said commutator are subjected to intense heat to decompose the insulation thereon preparatory to fluxing and soldering of the wires in place.

6. The method of claim 1 wherein said commutator is turned and axially advanced toward said body; and wherein said commutator is locked on said shaft in the aforesaid turned and axially advanced position by application and setting of a high shear strength liquid plastic at the commutator-shaft joint.

7. The method of claim 1 wherein said commutator has a radially slotted flange in which the outer portions of the slots converge to facilitate placing of the wires in the inner portions; subsequently removing excess material from said flange to produce a completed armature.

References Cited in the file of this patent

UNITED STATES PATENTS

| | | |
|---|---|---|
| 1,661,332 | Gomory | Mar. 6, 1928 |
| 1,857,175 | Apple | May 10, 1932 |
| 2,381,750 | Hunsdorf | Aug. 31, 1945 |
| 2,779,886 | Hunsdorf | Jan. 29, 1957 |
| 2,883,119 | Braun | Apr. 21, 1959 |

OTHER REFERENCES

Croft, Terrell: Alternating Current Armature Windings, first edition, pp. 34, 35, McGraw-Hill, N. Y., 1924.

Arnold, E.: Die Gleichstrommachine, 1st edition, pp. 98, 99, Figs. 104, 105.

Arnold E.: Die Gleischstrommachine, 2nd edition, pp. 107, 108, Julius Springer, Berlin, 1906 and 1907.

Arnold E.: Die Gleischstrommachine, page 68, Fig. 77, Julius Springer, Berlin, 1906.